United States Patent [19]

Kimura

[11] Patent Number: 4,941,898
[45] Date of Patent: Jul. 17, 1990

[54] MULTICYLINDER ROTARY APPARATUS FOR DESULFURIZATION FROM EXHAUST GAS

[75] Inventor: Takeshi Kimura, Domir Umeda No. 308, No. 11-7, Izumi 1-chome, Suginami-ku, Tokyo-to, Japan

[73] Assignees: Takeshi Kimura; Shigeru Kimura; Noriko Kimura; Junko Kimura, all of Tokyo, Japan

[21] Appl. No.: 357,070

[22] Filed: May 25, 1989

[30] Foreign Application Priority Data

May 30, 1988 [JP] Japan .................... 63-130182

[51] Int. Cl.$^5$ ............................................ B01D 53/18
[52] U.S. Cl. .................................. 55/230; 55/233; 55/240; 261/92
[58] Field of Search ................ 55/73, 220, 227, 228, 55/230–233, 240; 261/92

[56] References Cited

U.S. PATENT DOCUMENTS

| | | | |
|---|---|---|---|
| 1,775,036 | 9/1930 | Dunning | 261/92 |
| 1,826,256 | 10/1931 | Richter | 55/232 X |
| 1,942,085 | 1/1934 | Carey | 55/232 |
| 3,266,784 | 8/1966 | Saito | 55/232 X |
| 3,285,586 | 11/1966 | Powers | 55/232 X |
| 3,479,801 | 11/1969 | Yamasaki | 55/232 |
| 3,635,000 | 1/1972 | Brown | 55/223 X |
| 3,754,378 | 8/1973 | Christensen et al. | 55/233 X |
| 3,956,127 | 5/1976 | Holmberg | 261/92 X |

FOREIGN PATENT DOCUMENTS 52-011674  4/1977  Japan .
53-019171  5/1978  Japan .

Primary Examiner—Robert Spitzer
Attorney, Agent, or Firm—Christensen, O'Connor, Johnson & Kindness

[57] ABSTRACT

A gas desulfurization apparatus is disclosed. The apparatus includes a cylinder casing containing a number of rotating cylinders. Secured to each end of the rotating cylinders is a circular end plate, and within each of the cylinders is fill material having voids or cavities thereon. A desulfuring slurry reservoir is located in the base of the cylinder casing and a waste slurry pit is similarly connected the casing. A lifter is associated with each of the rotating cylinders and is arranged so that, as the cylinders rotate, a quantity of desulfuring slurry from the slurry reservoir is transferred into the associated rotating cylinder.

5 Claims, 2 Drawing Sheets

MULTICYLINDER ROTARY APPARATUS FOR DESULFURIZATION FROM EXHAUST GAS

FIELD OF THE INVENTION

The present invention relates to an apparatus for desulfurization from exhaust gas adapted for efficient removal of sulphur dioxide causing air pollution from combustion waste gas produced from facilities such as factories and thermal power plants.

BACKGROUND OF THE INVENTION

Many such apparatuses for desulfurization from exhaust gas are well known, for example, from Japanese Utility Model Publication No. 1978-19171 and Japanese Patent Publication No. 1977-11674 both in the name of the inventor of the present application. The former discloses an arrangement in which a lifter mounted on the inner wall of a rotatable cylinder containing a quantity of gas absorbent liquid stored therein scoops a partial quantity of said gas absorbent liquid as said cylinder rotates and uniformly distributes said scooped absorbent liquid onto layers of filling materials in said cylinder through which gas to be processed flows. The latter publication discloses an arrangement in which an exhaust gas processing cylinder containing a quantity of gas absorbent liquid stored therein is provided through the inner peripheral wall with slit so that said slit cooperates with a trough provided around the outer peripheral wall of said processing cylinder to assure continuous and uniform distribution of said gas absorbent liquid onto filling materials.

However, the apparatus of prior art is inconvenient in that an attempt to enlarge a diameter of the rotatable cylinder through which gas to be processed in order to obtain an apparatus for desulfurization from exhaust gas of a large capacity possible causes the filling materials contained therein to be damaged or destroyed.

A primary object of the invention is to provide an inexpensive apparatus for desulfurization from exhaust gas adapted to process a large quantity of gas and thereby to eliminate the above-mentioned inconvenience.

SUMMARY OF THE INVENTION

The object of the present invention as set forth above is achieved by multicylinder rotary apparatus for desulfurization from exhaust gas comprising a cylinder casing provided at axial one end with an inlet for gas to be processed and at the opposite end with an outlet for gas to be processed; a plurality of cylinders arranged within the cylinder casing around a horizontal central axis of said cylinder casing so that the respective cylinders move around the rotatable shaft corresponding to said central axis; a gas seal disc perpendicular to said rotatable shaft is provided within said cylinder casing, said rotatable shaft and one end of each cylinder extending through said gas seal disc so that a quantity of gas to be processed flows from the inlet through the respective cylinders to the outlet, a plurality of independent filling materials having voids or cavities thereon or therein provided to fill the interior space of the respective cylinders; and end plate in the form of circular-, polygonal- or oval-ring mounted on opposite end surfaces of each cylinder, inlet and outlet for desulfurizing slurry defined by one end and the opposite end, respectively, of each cylinder, and a plurality of lifters each axially mounted on inner or outer cylinder wall to scoop a quantity of desulfurizing slurry stored in a bottom of each cylinder and flowing from one end to the opposite end of each cylinder so that a quantity of slurry scooped by each of said lifters as the cylinder moves around the rotatable shaft can be continuously and uniformly distributed onto layers of said filling materials in proportion to a flow rate of gas to be processed by this cylinder or a cross section of the cylinder.

With the apparatus for desulfurization from exhaust gas thus constructed in accordance with the present invention, gas to be processed is brought into contact with desulfurizing slurry within a plurality of cylinders arranged in axially parallel relationship within a cylinder casing for movement around a horizontal, central rotatable shaft of said cylinder casing. An inlet for gas to be processed is defined by axially one end and an outlet for processed gas is defined by the opposite end of the cylinder.

Correspondingly, the cylinder is provided at one end with means for supplying of desulfurizing slurry and at the opposite with an outlet of waste slurry. In this way, gas to be processed is brought into contact with desulfurizing slurry in counterflow or parallel flow relationship. A quantity of desulfurizing slurry supplied and stored in lower portions of the cylinders and flowing from one end to the opposite end is scooped by a plurality of lifters axially and parallel to one another mounted on inner or outer walls of the respective cylinders. The respective cylinders containe therein a plurality of independent layered filling materials each having voids or cavities thereon and therein so as to form film of desulfurizing slurry, to promote gas-liquid contact as efficient as possible and thereby to achieve the optimum absorption of sulphur dioxide. The lifters move up and down as the cylinders move around the rotatable shaft of the cylinder casing and thereby desulfurizing slurry is continuously and uniformly distributed onto the layers of filling materials.

The number, the sizes, the configurations and the arrangement of cylinders are selected so that the area of the gas seal disc except the gas seal portions may be effectively utilized.

DESCRIPTION OF THE DRAWINGS

The present invention will be more apparent from reading the following description of a preferred embodiment in reference with the accompanying drawing.

DESCRIPTION OF THE PREFERRED EMBODIMENT

Figure 1:
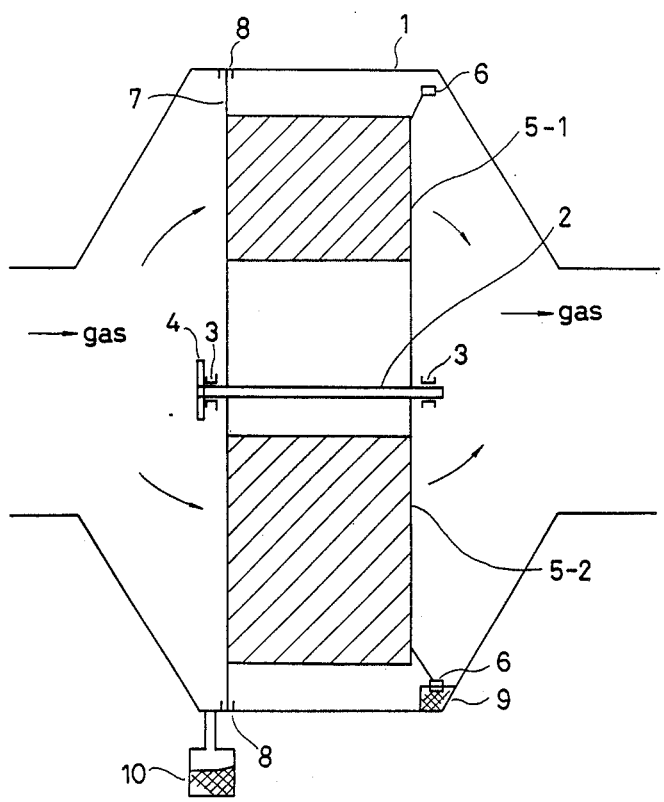
FIG. 1 is a sectional side view of an apparatus according to the invention and FIG. 2 is a front view showing arrangement of respective cylinders.
Figure 2:
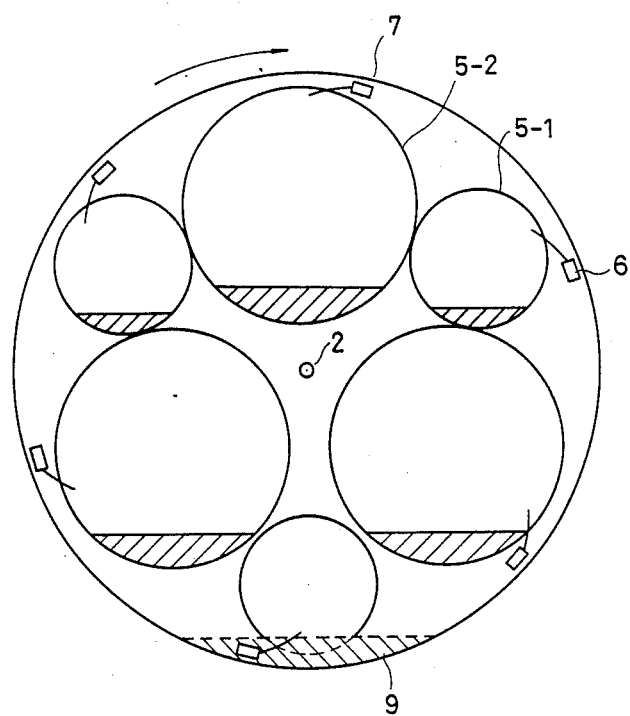

Referring to FIG. 1, reference numeral 1 designates a cylinder casing containing therein a plurality of cylinders and provided on the inner peripheral wall with a gas seal mechanism 8 that is combined with a gas seal disc 7 opposed thereto so as to partition a gas inlet side and a gas outlet side. FIG. 1 further shows a rotatable shaft 2, bearing means 3, and a drive sprocket 4. A plurality of small diameter cylinders 5-1 and a plurality of large diameter cylinders 5-2 are arranged within the cylinder casing 1. These cylinders are integrally connected to the rotatable shaft 2 by appropriate components (not shown) to form a body of revolution as a whole. As a result, the small and large diameter cylinders move around the rotatable shaft. The cylinders 5-1 and 5-2 are filled with independent filling materials having voids or cavities thereon and are provided with an end plate at each end in the form of a circular-, polygonal-, or oval-ring (fill material and ring not illustrated).

This specific embodiment comprises three large diameter (4 m) cylinders and three small diameter (2.2 m) cylinders.

The diameters, the number and the arrangement of these cylinders are determined depending on a desired quantity of gas to be processed as well as a diameter of the cylinder casing. Reference numeral 7 designates a gas seal disc separating the gas inlet side and the gas outlet side, through which the rotatable shaft 2 and the cylinders 5-1, 5-2 extend so that only the areas defined by the cylinders permit gas to pass through the gas seal disc 7 and the remaining area is gas-tight. Thus, a quantity of gas introduced from the left-hand side as seen in FIG. 1 into the cylinder casing flows through the respective cylinders, reaches the right end of the cylinder casing and leaves it.

Reference numeral 8 designates a gas seal mechanism mounted on the inner peripheral wall of the casing 1 and cooperates with the gas seal disc 7 to achieve gas seal.

Reference numberal 9 designates a gas absorptive slurry supply reservoir arranged within the cylinder casing 1. The reservoir 9 is supplied with gas absorptive slurry adapted to meet a desired quantity of gas to be processed as well as a concentration of sulphur dioxide.

More specifically, the reservoir 9 is supplied with said gas absorptive slurry automatically controlled so as to maintain the concentration (ppm) of sulphur dioxide in exhaust gas or pH of waste slurry after absorption at a constant level.

Reference numeral 6 designates scoops and pipes adapted to distribute from the absorptive slurry supply reservoir 9 the quantities of slurry in proportion to the quantities of gas to be processed in the respective cylinders into the latters. This particular embodiment comprises three large diameter cylinders and three small diameter cylinders. The respective cylinders are provided on their respective axial walls with the scoop/pipe assemblies, wherein a ratio of the scoop for the large diameter cylinder and the scoop for the small diameter cylinder have their widths dimensioned in proportion to a ratio of cross sections of the large diameter cylinder and the small diameter cylinder.

Each scoop moves along the circumference of a circle at an equidistance from the center of the rotatable shaft so that a quantity of gas absorptive slurry which has been scooped by the scoop as the latter has passed the lower portion of the circumference flows through the associated pipe and then supplied into the cylinders as the scoop moves upwards. Relative angles or angular distances of the respective scoops, in this embodiment, are 360°/3=120° for the large diameter cylinders and similarly 360°/3=120° for the small diameter cylinders. Between each pair of adjacent large and small diameter cylinders, the scoops thereof are spaced 60° from each other.

Although the supply of gas absorptive slurry occurs intermittently rather than continuously so far as the individual cylinders are concerned, this does not affect the desired desulfurization since substantially larger quantity of slurry has already been stored in the individual cylinders than the quantity of slurry thus intermittently supplied.

Reference numeral 10 designates a waste slurry pit disposed externally and beneath the cylinder casing 1, and a quantity of waste slurry which has overflowed end plates of the respective cylinders and flow down under the gravity is collected into this pit 10 for subsequent processes (e.g., oxidizing process, dehydrating process).

Now, a specific example using the inventive apparatus for desulfurization from exhaust gas will be described.

| Dimensions of the Apparatus: | |
| --- | --- |
| Diameter of the cylinder casing: | 10 m |
| Length of the cylinder casing: | 10 m |
| Height of the cylinder casing: | 10 m + a |
| Individual cylinders: | |
| (3 large diametered) | 4 mo × 3 m |
| (3 small diametered) | 2.2 mo × 3 m |
| Rate of gas processing: | 265,000 m$^3$/h |
| Percentage of desulfurization: | 95% |
| Revolving speed: | 4 rpm |
| Absorbent: limestone powder slurry (solid percentage 10%) | |
| Filling material: | 75 mmo net ring |
| Lifter: | 100 mm × 75 mm × 30 mm |
| Height of end plate: | |
| 350 mm at the inlet of absorptive slurry | |
| 130 mm at the outlet of absorptive slurry | |
| Cross section of scoop: | |
| 100 × 160 mm for the large diameter cylinder | |
| 100 × 48 mm for the small diameter cylinder | |

Although the properties of the inventive apparatus for desulfurization from exhaust gas have previously been described in connection with the above-mentioned Japanese Utility Model Publication No. 1978-19171 and Japanese Patent Publication No. 1977-11674, it has been found from the results of subsequent operation that the effect of desulfurization from exhaust gas as high as in the order of $SO_2$ concentration 20 ppm in exhaust gas. It has also been found that, for combustion waste gas mixed with air, calcium sulfite produced within the apparatus is 100% oxidized in this apparatus and discharged as gypsum, allowing the oxidizing process to be eliminated, as opposed to so-called lime-gypsum desulfurization from exhaust gas of prior art which has normally employed such oxidizing process. Furthermore, the apparatus of the invention requires no man power to monitor operation of the apparatus and advantageously reduced quantity of water consumption.

As will be apparent from the foregoing description, the multicylinder rotary apparatus for desulfurization from exhaust gas of this invention provides numerous effects as set forth below.

1. Desulfurization from combustion waste gas produced in facilities such as factory and thermal power plant can be achieved as efficiently as in order of $SO_2$ concentration 20 ppm in exhaust gas.
2. Calcium sulfite produced with the apparatus is 100% oxidized within the same apparatus and discharged as gypsum, allowing the oxidizing process usually employed by the lime-gypsum desulfurization from exhaust gas of prior art to be eliminated and thus providing a compact and inexpensive apparatus for desulfurization from exhaust gas.

3. The revolving cylinders through which gas to be processed may be relatively small and filling material therein is prevented from being damaged.

4. No man power is required to monitor operation of the apparatus and a quantity of water consumption is effectively reduced, improving an economical efficiency.

Although the present invention has been described in reference with the particular embodiment, it is not intended to limit the invention to such embodiment and various modifications and variations are possible without departure from the spirit and the scope of the present invention.

The embodiments of the invention in which an exclusive property or privilege is claimed are defined as follows:

1. A gas desulfurization apparatus comprising:
   (a) a cylinder casing having an axis and forming a gas inlet and a gas outlet;
   (b) a plurality of rotating cylinders in said cylinder casing, each said rotating cylinder axially parallel to said cylinder casing axis and arranged to rotate about said cylinder casing axis, and having an open end adjacent said cylinder casing gas inlet and an open end adjacent said cylinder casing gas outlet;
   (c) a drive system means disposed in said cylinder casing attached to each of said cylinders for rotating said cylinders about said cylinder casing axes;
   (d) a gas seal disc in said cylinder casing perpendicular to said cylinder casing axis and extending between said cylinder casing and said rotating cylinders for directing gas flow through said rotating cylinders;
   (e) a reservoir in said cylinder casing for storing a desulfuring slurry;
   (f) a waste slurry pit connected to said cylinder casing; and,
   (g) a lifter attached to each said rotating cylinder to transfer a quantity of desulfuring slurry from said slurry reservoir into said associated cylinder during the rotating of said cylinders.

2. The gas desulfurization apparatus of claim 1, further including independent filling material having cavities therein disposed inside said rotating cylinders.

3. The gas desulfurization apparatus of claim 2, further including a ring-shaped end plate disposed over each end of said rotating cylinders.

4. The gas desulfurization apparatus of claim 1, further including a rotating shaft axially disposed inside said cylinder casing and said rotating cylinders integrally connected to said rotating shaft.

5. The gas desulfurization apparatus of claim 1, wherein said gas seal disc is connected to said rotating cylinders adjacent said rotating cylinder open ends adjacent to said cylinder casing gas inlet.

* * * * *

UNITED STATES PATENT AND TRADEMARK OFFICE
CERTIFICATE OF CORRECTION

PATENT NO. : 4,941,898

DATED : July 17, 1990

INVENTOR(S) : Takeshi Kimura

It is certified that error appears in the above-identified patent and that said Letters Patent is hereby corrected as shown below:

| Column | Line | |
|---|---|---|
| 57, Abstract | 9 | After "connected" insert --to-- |
| 1 | 28 | After "with" insert --1-- |
| 1 | 37 | Delete "possible" and insert therefor --possibly-- |
| 2 | 16 | Delete "by axially" and insert therefor --axially by-- |
| 2 | 29 | Delete "containe" and insert therefor --contain-- |
| 3 | 25 | Delete " numberal" and insert therefor --numeral-- |
| 3 | 54 | Delete "cylinders" and insert therefor --cylinder-- |

Signed and Sealed this

Eighteenth Day of February, 1992

Attest:

HARRY F. MANBECK, JR.

*Attesting Officer*  *Commissioner of Patents and Trademarks*